United States Patent [19]

Anderson

[11] Patent Number: 4,631,217
[45] Date of Patent: Dec. 23, 1986

[54] HONEYCOMB STRUCTURE WITH Z-FOLDED MATERIAL AND METHOD OF MAKING SAME

[75] Inventor: Richard N. Anderson, Owensboro, Ky.

[73] Assignee: Hunter Douglas Inc., Totowa, N.J.

[21] Appl. No.: 791,239

[22] Filed: Oct. 25, 1985

[51] Int. Cl.[4] .............................................. B32B 3/12
[52] U.S. Cl. ................. 428/118; 160/84 R; 428/188
[58] Field of Search ...................... 156/197; 160/84 R; 428/116, 118, 188, 117; 52/806

[56] References Cited

U.S. PATENT DOCUMENTS

| | | | |
|---|---|---|---|
| Re. 30,254 | 4/1980 | Rasmussen | 428/12 X |
| Re. 31,129 | 1/1983 | Rasmussen | 428/188 X |
| 1,677,714 | 7/1928 | Frease | 428/188 X |
| 1,827,718 | 10/1931 | Whitney | 428/188 X |
| 2,020,639 | 11/1935 | Grayson et al. | 428/130 |
| 2,201,356 | 5/1940 | Terrell | 160/84 R |
| 3,077,223 | 2/1963 | Hartsell et al. | 428/118 X |
| 3,164,507 | 1/1965 | Masuda | 428/116 X |
| 3,168,432 | 2/1965 | Elfving | 428/116 |
| 3,669,820 | 6/1972 | Fredericks | 428/116 |
| 3,788,922 | 1/1974 | Rasmussen | 156/197 X |
| 3,892,898 | 7/1975 | Yasui | 428/116 |
| 4,001,474 | 1/1977 | Hereth | 428/188 X |
| 4,019,554 | 4/1977 | Rasmussen | 428/188 X |
| 4,288,485 | 9/1981 | Suominen | 428/116 |
| 4,307,768 | 12/1981 | Anderson | 428/116 X |
| 4,388,354 | 6/1983 | Suominen | 428/116 X |
| 4,450,027 | 5/1984 | Colson | 428/116 X |

FOREIGN PATENT DOCUMENTS 756270  9/1956  United Kingdom ............... 428/181

*Primary Examiner*—Henry F. Epstein
*Attorney, Agent, or Firm*—Pennie & Edmonds

[57] ABSTRACT

A honeycomb structure formed of a continuous length of foldable material which is folded into a Z-configuration and stacked in layers which are adhered together. These layers form longitudinally extending cells, one on top of the other, of the honeycomb structure.

12 Claims, 9 Drawing Figures

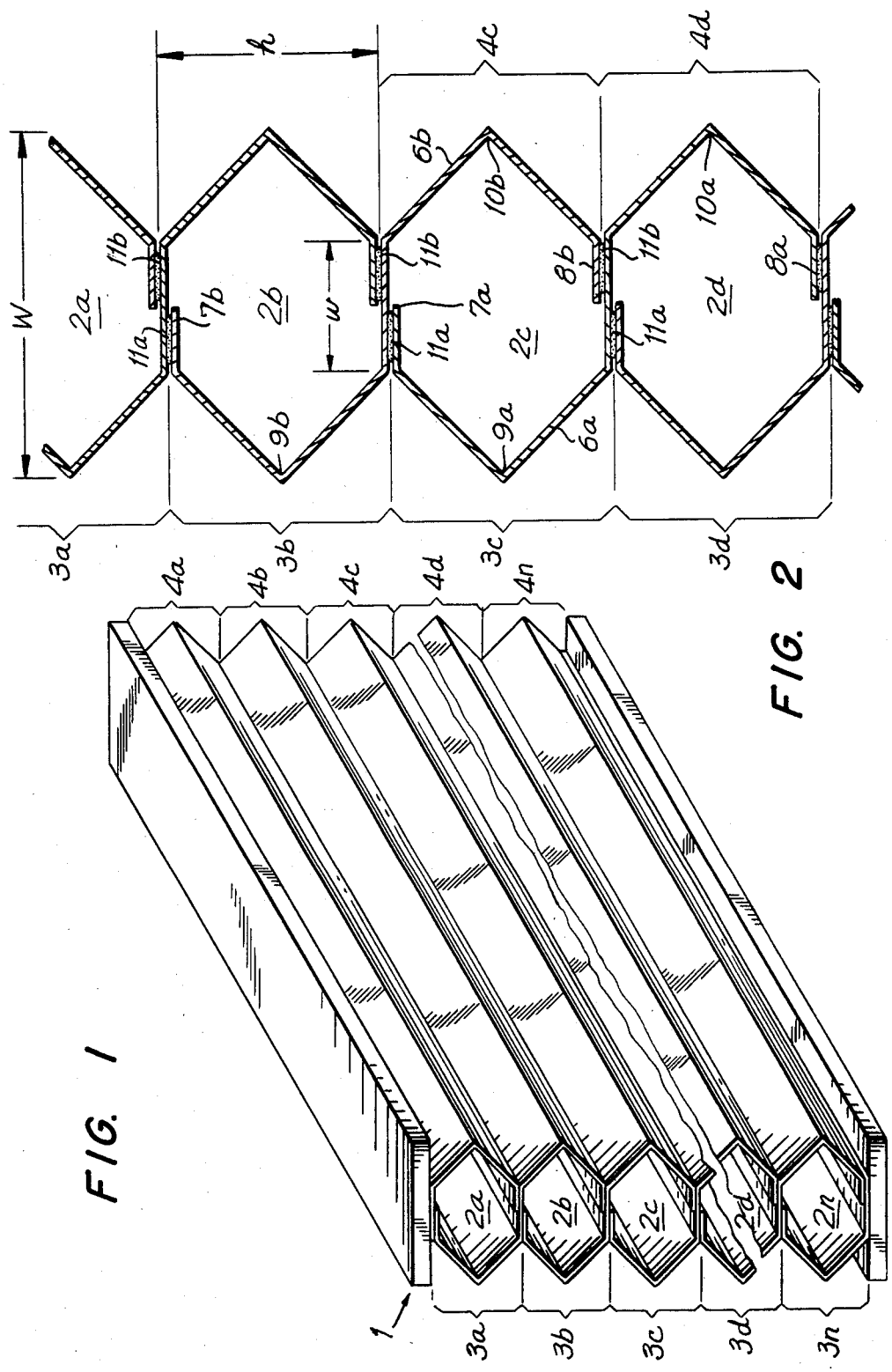

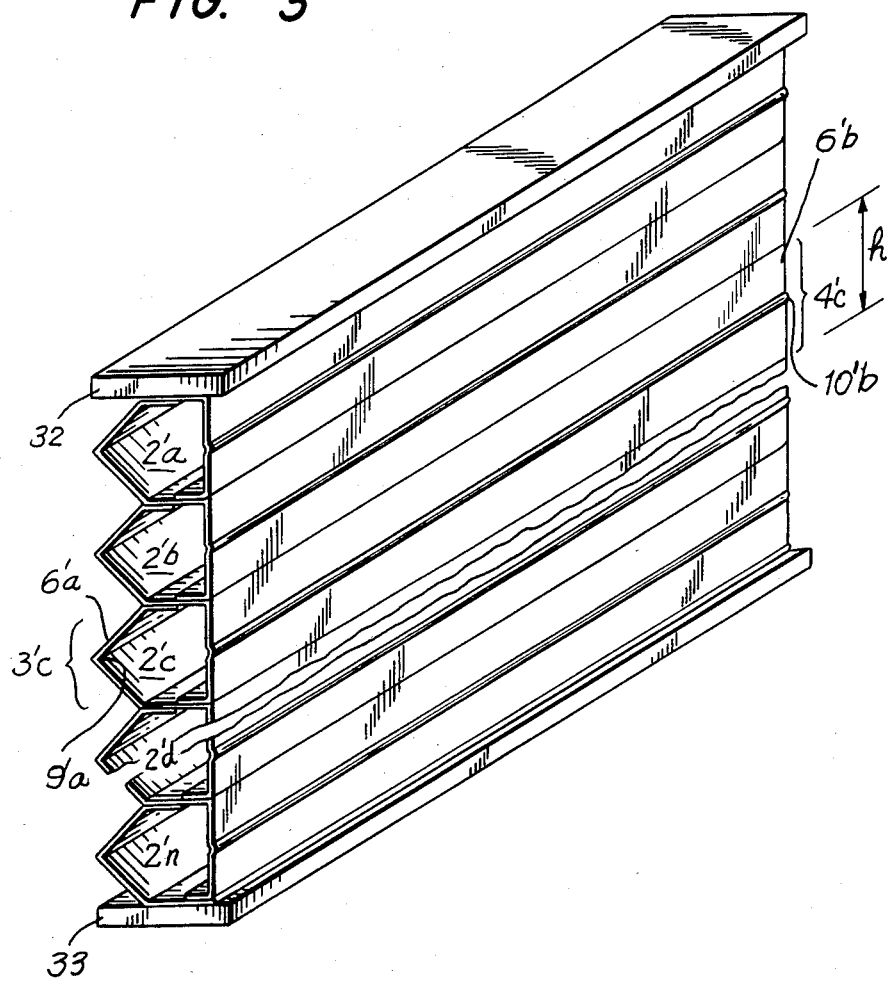
FIG. 3
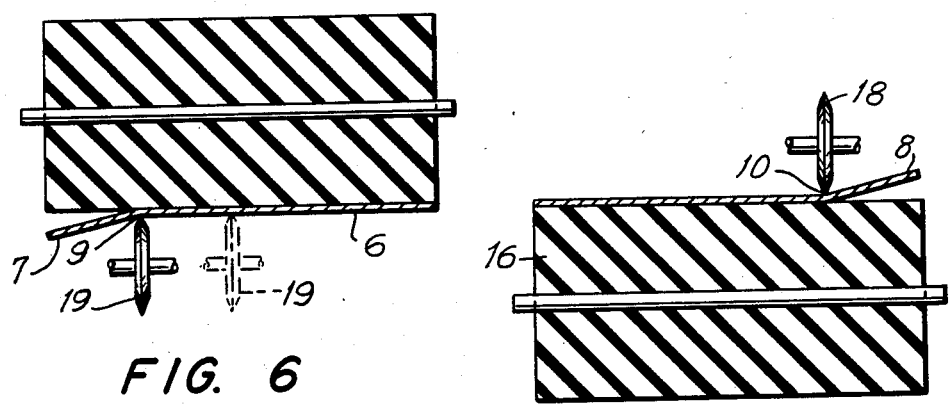
FIG. 5
FIG. 6

HONEYCOMB STRUCTURE WITH Z-FOLDED MATERIAL AND METHOD OF MAKING SAME

BACKGROUND OF THE INVENTION

The present invention relates to an expandable honeycomb structure such as used for window coverings. The structure is made of foldable material which in the expanded condition defines a plurality of longitudinally extending cells, one on top of the other. In the retracted or collapsed state of the honeycomb structure, the adjacent cells are collapsed on each other.

The prior art discloses various honeycomb structures made from foldable material. Representative of such prior art are the Rasmussen U.S. Pat. Nos. Re. 30,254, and Re. 31,129, the patents to Suominen, U.S. Pat. Nos. 4,288,485 and 4,388,354, and the patent to Masuda, 3,164,507. In addition, U.S. Pat. No. 4,450,027 to Colson discloses a honeycomb structure constructed from foldable material which is folded longitudinally of the material and wound onto a rack in overlying layers. The layers are adhered together to form the cells of the honeycomb structure. The present invention is most directly a variation of the honeycomb structure and method of making it as disclosed in the '027 patent.

In making window blinds or panels out of the honeycomb structures of the prior art, it is sometimes desirable, either for aesthetic or mechanical reasons, to have the opposite sides of the blind of different physical characteristics. For example, where thermal insulation against heat or cold is desired, the outside of the blind may be constructed to provide a heat reflective or absorbent surface whereas the inside a more decorative surface. Also, where pure aesthetics are concerned, opposite sides of the blind may simply be of different colors. Colors may also be used for providing thermal characteristics to the blind in addition to the insulation characteristic provided by the basic honeycomb structure described in the '027 patent.

With the prior art honeycomb structures, providing different physical characteristics on the opposite sides of the structure requires the use of different materials for the opposite sides which must be separately adhered together. Alternatively, where the honeycomb structure is made of a single piece of material as in the '027 patent, the different portions which will define the opposite sides of the structure have to be separately processed prior to the formation of the honeycomb configuration. In the latter type of construction, problems of alignment of the treating process can occur. For example, where different parts of the material must be treated differently across the width of the material, the line of demarcation between the two different surfaces must be fairly accurately formed. This is necessary so that the line will be hidden in the final structure. Otherwise, the physical characteristics meant for one side of the final honeycomb structure may show through on the other side in the expanded condition of the cells.

Another aspect of the honeycomb structures of the prior art relates to the creasing or pleating of the material forming each cell along fold lines. One reason pleating is provided is to assist in the orderly collapsing of the individual cells as the structure is moved from an expanded to a retracted position. Without pleats, the collapsing of the cells would tend to be haphazard and not give a neat appearance to the structure.

There are generally two types of honeycomb cell constructions. One is where the pleats generally hang out in the expanded condition of the honeycomb structure. That is, the opposite sides of the honeycomb structure generally lie in parallel planes with the connection of the adjacent cells extending completely across each cell from one side of the structure to the other. Another type of cell construction is disclosed in the '027 patent. Here, the pleats are formed to be permanent and they do not hang out in the expanded condition of the structure. With this construction, the adjacent cells are joined together over a distance which is less than the spacing between the opposite sides of the honeycomb structure.

If the pleats in the type of honeycomb structure disclosed in the '027 patent are not carefully and properly formed, they will tend to hang out. This is especially so after long, continued use of the structure with the expanded condition being one where the cells lie one on top of the other. In such an orientation, the weight of the structure itself pulls on the material of the overlying cells with the greatest forces being exerted at the top of the structure by the entire weight of the underlying cells. Any falling out of the pleats tends to increase the overall height of the structure over the height as initially manufactured. The effect of this can be unpleasing and unsatisfactory, both aesthetically and physically.

SUMMARY OF THE INVENTION

According to the teachings of the present invention, an expandable-collapsible honeycomb structure is provided from a single length of material with the opposite sides of the material being used to form the opposite sides of the completed structure. Thus, different physical characteristics can be provided on opposite sides of the structure by simply treating or constructing the opposite sides of the material in accordance with the desired result. Problems of process alignment are avoided. A panel of the expandable-collapsible honeycomb structure is well suited for use as a raisable window covering.

With applicant's invention, the cell structure of the honeycomb is formed by longitudinally folding a continuous length of material adjacent each longitudal edge. More particularly, one edge is folded over one side of the length of material and the other edge over the other side as the length of material is fed in a direction along its length and wound into a continuous loop. The continuous loop contains layers of the material in its folded condition; and these layers are adhered together adjacent the edges of the material. The initial folding of the material is generally a Z-fold and orients the opposite sides of the material so that when looped into continuous layers and adhered together, the opposite sides of the material automatically define the opposite sides of the resulting honeycomb structure.

During the folding process, the material is advantageously creased along the fold lines to provide permanent folds. As with the prior art, these folds assist in the collapsing of the cells in an orderly fashion. The folds can also be permanent to the extent that they prohibit the folds from falling out and thus create an expanded condition where the opposite sides of the cells extend in non-parallel relationship. This gives a pleated look to the final honeycomb structure.

Where the structure is to be used as a covering for a window, the pleated appearance may be more significant on the inside rather than on the outside of the structure which faces the window. In order to maintain this pleated appearance, the connection of the cells in accordance with the teachings of the present invention is such as to permit the folds to hang out on one side of the structure but not on the other. This result is produced by adjusting the location of the line of connection of the adjacent cells laterally of the width of the cells in conjunction with the amount of material which is folded over each longitudinal edge. The resulting construction has one side where the faces of the cells extend in a straight plane between adjacent cells. Thus, there is no further tendency for the structure to expand and the pleats on the other side will have no further tendency to fall out beyond the amount initially provided for in the manufacturing process.

BRIEF DESCRIPTION OF THE DRAWINGS

FIG. 1 is a perspective view of the honeycomb structure in its expanded condition and fabricated according to the teachings of the present invention;

FIG. 2 is a cross-sectional view of a number of the adjacent cell structures of the honeycomb structure shown in FIG. 1;

FIG. 3 is a partial perspective view of a modified embodiment of the honeycomb structures shown in FIG. 1;

FIG. 5 is a cross-sectional view taken along lines 5—5 of FIG. 4;

FIG. 6 is a cross-sectional view taken along lines 6—6 of FIG. 4;

DETAILED DESCRIPTION OF THE PREFERRED EMBODIMENTS

Figure 4:
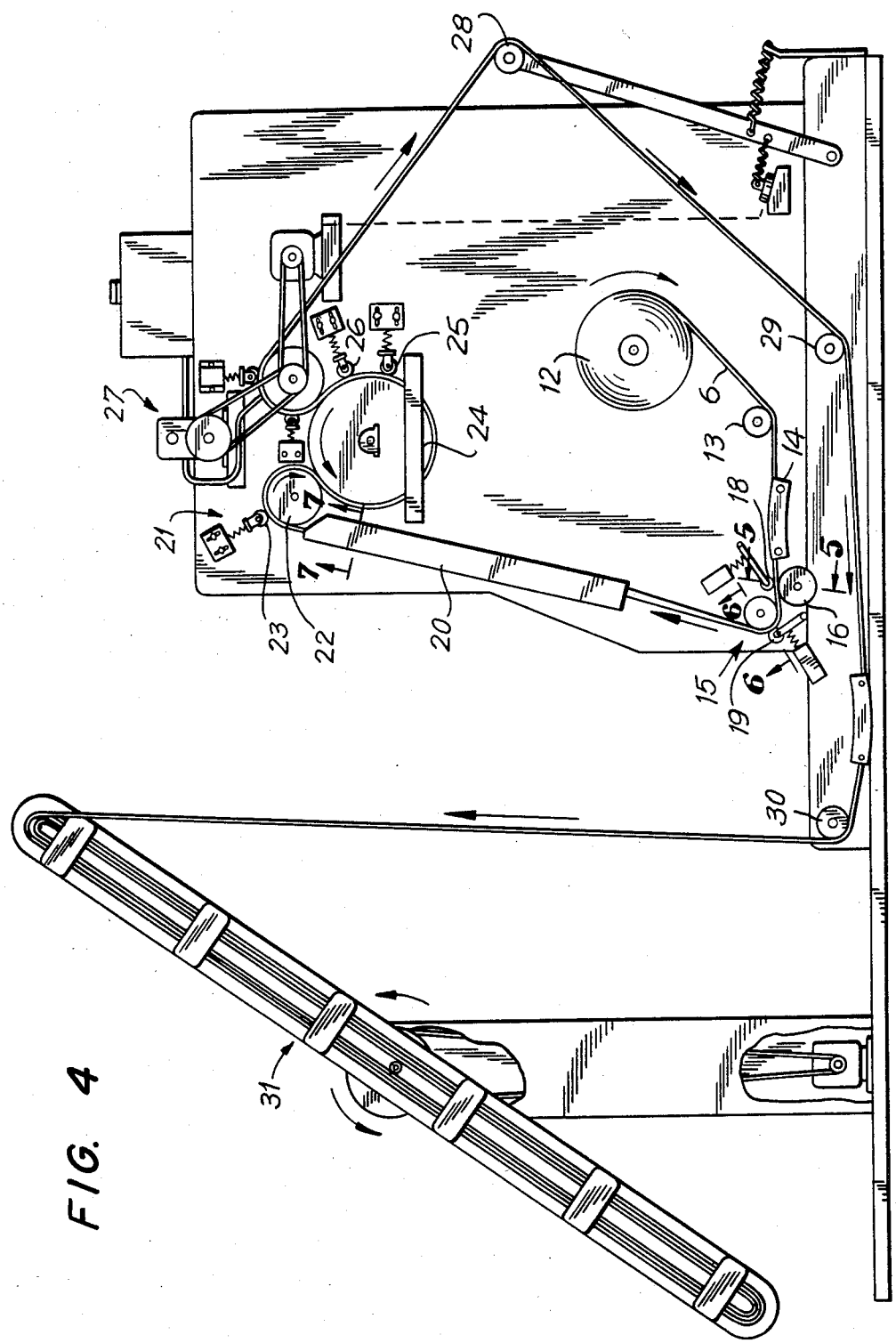
FIG. 4 is a plane view of a suitable apparatus for fabricating the honeycomb structure according to the teachings of the present invention.

As shown in FIGS. 1 and 2, the expandable honeycomb structure of the present invention generally designated by reference number 1 is constructed of a plurality of longitudinally extending cells $2a$ through $2n$, n being a number correlated to the overall dimension of the honeycomb structure in expanded condition. Each cell has a longitudinally extending front face $3a$ through $3n$ and a longitudinally extending back face $4a$ through $4n$. The front face of any one cell, intermediate the ends of the honeycomb structure, and the back face of an adjacent cell is defined by a first piece of material. Also, the back face of the one cell and the front face of another adjacent cell is defined by a second separate piece of material. For the purpose of easy identification, the faces 3 are referred to as front faces, and the faces 4 as back faces. "Front" and "back" hold no limitation as to the position of the structure, for example, when used as window coverings in building constructions. Also, "honeycomb" is used in the broad sense to mean connected cells, not necessarialy hexogonal, as described and shown herein.

With reference to FIG. 2 where complete cells $2b$, $2c$ and $2d$ are shown, the front face $3c$ of cell $2c$ and the back face $4d$ of the adjacent underlying cell $2d$ is constructed from a single piece of material $6a$. The back face $4c$ of cell $2c$ is, on the other hand, formed from a different piece of material $6b$. This material also forms the front face $3b$ of the adjacent, overlying cell $2b$.

The individual cells are closed into expandable structures at the same time that the adjacent cells are connected together. With reference to cell $2c$, its cell structure is completed by use of adhesive $11a$ to adhere the one longitudinal edge $7a$ to a section of the second material $6b$ adjacent the front face $3b$ of the overlying cell $2b$. Similarly, the longitudinal edge $8b$ of the second piece of material $6b$ is adhered by the adhesive $11b$ to a section of the first material adjacent the back face $4d$ of the underlying cell. This pattern is continued throughout the adjacent cells to form the overall honeycomb structure. As seen from FIGS. 1 and 2, the adhering of the material to complete one cell has the effect of connecting the adjacent cells together. Also, each cell is itself constructed of a folded length of one piece of material and material from the next adjacent cell to which it is adhered.

The adhesive $11a$ and $11b$ is applied longitudinally of the cells with the two strips together extending over a lateral width w which is less than the overall width W of the cells in their expanded condition. The width w controls the spacing the front face and back face of the cell structure. As seen from FIG. 2, the combined width of the adhesive $11a$ and $11b$ extends over a lateral section of the material $6b$ to space the front face $3b$ from the back face $4c$ of the adjacent cells $2b$ and $2c$. Similarly, the adhesive $11a$ and $11b$ extends over the lateral section of the material $6a$ of the adjacent underlying cells $2c$ and $2d$ to space the front face $3c$ from the back face $4d$ of these cells.

To provide a pleated appearance to both faces of the honeycomb structure so as to assist in the orderly collapsing of the cells, the folding of the opposite longitudal edges of each length of material is effected to produce permanent creases. With reference to the material $6a$, these creases are shown in $9a$ and $10a$. Similar creases $9b$ and $10b$ are formed in the material $6b$. It will be understood that each length of material is constructed in this manner.

In some situations, it is desirable to provide the pleated configuration on only one face of the honeycomb structure. Such a construction is shown in FIG. 3 where the front face of each cell has a greater amount of material extending between adjacent cells than the back face thereof. More specifically, front face $3'c$ of cell $2'c$ has an angular configuration defined by the crease $9'a$ at the fold line in the material $6'a$. The back face $4'c$ of this cell is generally planar in construction with the amount of material extending in a straight plane between adjacent cells and being generally equal to the height h of the cell. The crease $10'b$ is provided for assisting in the collapsing of the cell but is not of sufficient strength to prevent its falling out in the normal expanded condition of the honeycomb structure. With the back faces of all the back cells having the same planar shape, the normal expanded condition of the structure as shown in FIG. 3 has reached a limit of expansion. No further expansion is possible, and thus the pleated configuration on the front face has no further tendency to pull out as might otherwise occur over continued use and hanging in a vertical direction.

With the folding of the lengths of material as described above all being identical and with each length overlying another length in identical fashion, a unique honeycomb structure is provided. In accordance with the method of manufacture of the honeycomb structure as more fully described below, a single, continuous length of material is used to progressively form the individual cells. Therefore, the outer surface of the front face of each cell will be formed by one side of this material and the outer surface of the back face of each cell will be formed by the other side of the material. This permits the honeycomb structure to be manufactured from a single continuous length of material with different physical characteristics on the front face than on the back face by simply processing one side of the material differently than the other side. This processing may be a coating operation, a coloring operation, or some other treatment which results in a different physical characteristic. Also, material may be formed from a laminated or two-ply structure.

In forming the honeycomb structures shown in FIGS. 1-3, a method based on the method disclosed in U.S. Pat. No. 4,450,027 is employed. Accordingly, the disclosure of the '027 patent is incorporated herein by reference.

FIG. 4 of the present application is a plan view of the apparatus of the '027 patent as modified in accordance with the teachings of a present invention. As shown in FIG. 4, a supply of foldable material 6 is provided by the roll 12. The material may be a thin film of polyester plastic or Mylar, or a non-plastic material, such as non-woven or woven fabric or laminated material having similar or suitable characteristics for honeycomb structures. From the supply roll 12, the length of material is directed around the guide roller 13 and through an alignment block 14. The alignment block functions to keep the length of material in proper alignment for the initial creasing of the material. Creasing is effected by the creaser assembly 15. As shown in FIGS. 5 and 6, this assembly includes a pair of backing rollers 16 and 17 disposed on opposite sides of the length of material 6. Creaser wheels 18 and 19 cooperate, respectively, with the backing rollers 16 and 17. These wheels have a sharp peripheral surface. As the length of material 6 passes through the creaser assembly, a pair of creases 9 and 10 are formed in the material on opposite sides thereof. These creases define lines of demarcation between the opposite longitudinal edges 7 and 8 of the material 6 and the central section thereof.

Figure 7:
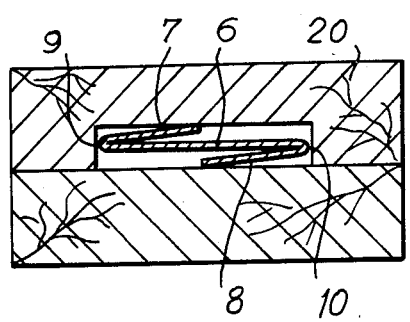
FIG. 7 is a cross-sectional view taken along the line 7—7 of FIG. 4.

After leaving the creaser assembly 15, the length of material 6 is fed through a folding mechanism 20. This mechanism may be constructed in any suitable manner to fold the length of material longitudinally along the crease lines 9 and 10. The folding is such as to fold the longitudinal edge 7 over one side of the length of material and the longitudinal edge 8 over the other side. This folding of the edges is done progressively as the length of material is fed through the folding mechanism 20. The folded condition of the length of material as it exits from the folding mechanism 20 is shown in FIG. 7. As there seen, the folding is generally in a Z pattern and folded edges generally meet along the central plane extending through the length of material but do not overlap.

After folding of the material, it is directed through a crimper assembly 21 which is comprised of facing crimp rollers 22 and 23. These rollers are aligned with each other and overlie one or both of the fold lines 9 and 10 to tightly press and squeeze the material so as to form a permanent fold along either or both of these lines. Depending on the nature of the material, this crimper may or may not be necessary. Where the material has the characteristics of the polyester film material disclosed in the '027 patent, the crimper assembly 21 would be utilized. Also with such material, the fold can be assured of being permanently set by further passing the folded material around the peripheral surface of the roller 24 which is heated. This roller and the cooperating press rollers 25 and 26 apply rolling pressure across the entire width of the material to set the crimps permanently at a sharp angle. Again, the roller structure 25 and 26 need not be included where the material does not require its use. Further, other structures may be used, provided that the fold lines 9 and 10 are properly set to maintain the angular configuration shown in FIG. 1. Also, in some situations, it may not be desirable to have permanent fold lines in both or either of the faces of the final honeycomb structure. It may also be desirable to have fold lines which only aid in assuring that the cells collapse in an orderly fashion.

Figure 9:
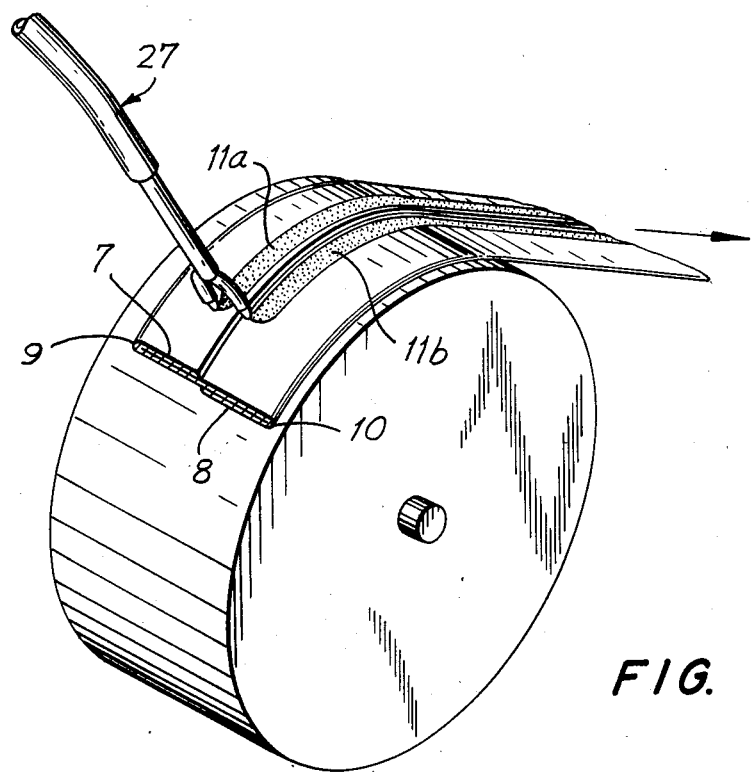
FIG. 9 is a perspective view of the adhesive applicator assembly used in constructing the honeycomb structure of the present invention.

An adhesive applicator 27 is provided for progressively applying the adhesive 11a and 11b longitudinally of the length of material. As shown in FIG. 9, the adhesive is applied in two continuous lengths. The adhesive 11a is applied to the folded over edge 7 while the adhesive 11b is applied to the area of the side of the material adjacent the longitudinal edge 7. The lengths of adhesive are applied at a distance which is spaced from the fold lines 9 and 10. As discussed above, the total lateral width w of the combined lengths of adhesive determines the separation between the front face and back face of the honeycomb structure. With the lateral width of each length of adhesive 11a and 11b being equal and centrally located, the resulting honeycomb structure in its expanded condition will be symmetrical with respect to a plane extending through the center of the structure.

Figure 8:
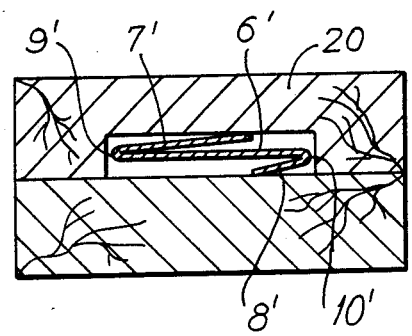
FIG. 8 is a cross-sectional view similar to FIG. 7 showing a modified embodiment of the folded construction of the cell material.

Where, on the other hand, it is desired to produce an unsymmetrical structure such as shown in FIG. 3, the lateral width of the two lengths of adhesive will, in effect, be offset from the center plane on the structure. This can be produced by folding the longitudinal edges of the length of material over onto the center portion of the length by different width distances. With reference to FIG. 8, the longitudinal edge of 7' of the length of material is folded along a fold line 9' and over a width greater than the folding of the longitudinal edge 8' along the fold line 10'. FIG. 6 shows, in dotted lines the adjustment required of the creaser wheel 19 for this purpose. The application of equal widths of adhesive 11a and 11b will result in a construction in which the distance between the adhesive 11b and the fold line 10' is less than the distance between the adhesive 11a and fold line 9'. Thus, if no more than a minimal crease is effected along the fold line 10', this fold will hang out when the cells are expanded. This construction is shown in FIG. 3 and provides the other face of the honeycomb structure with pleats which will not fall out over a period of extended use. The degree to which the pleats in the front face are angularly disposed with respect to each other can be controlled by the spacing of the adhesive from the fold line 10. This spacing will be one-half the resulting height of h of the expanded cell, or one-half the distance between adjacent cells. Thus, this distance can be predetermined and controlled to produce the desired angular configuration of the other side of the cell structure.

After the adhesive 11a and 11b is applied progressively to the length of material as it moves through the forming apparatus, the material is directed around suitable guide rollers 28, 29, 30 as more fully described in the '027 patent. From the last guide roller 30, the material is led to a stacking area where it is wound about a stacking arm 31 and into a continuous loop with successive portions of the length overlying preceding portions. This forms a plurality of adjacent stacked layers of folded length of material on the stacking arm. During this stacking operation, the lengths of adhesive 11a and 11b on the folded material are pressed into engagement with the facing side of the folded material to connect them together and form adjacent connected layers. More particularly, the outermost portion of the longitudinal edge 7 of any one layer of the stacked layers becomes adhered to the facing side of the next adjacent overlying layer, whereas the other longitudinal edge 8 of that layer becomes adhered to the facing side of the next adjacent underlying layer. With reference to FIG. 2, the outermost portions of the longitudinal edges 7 and 8 of the length of material 6a are shown at 7a and 8a while the outermost portions of the length of material 6b are shown at 7b and 8b.

After the desired amount of folded material is stacked on the stacking arm 31, the length is severed from the supply and the layers of the loop are severed to form a unitary stack of cells of finite length as shown in FIGS. 1 or 3. Alternatively, the layers of the loop can be cut into a number of unitary stacks of cells of finite length. With the unitary stack as thus formed, any excess material at the top and bottom can be severed and connected to suitable head and bottom rail structure 32 and 33.

I claim:

1. In an expandable honeycomb structure constructed of foldable material and defined by a plurality of longitudinally extending cells, one on top of the other, each cell having a longitudinally extending front face and a longitudinally extending back face, any one cell intermediate the end cells having a first and second adjacent cell, the improvement wherein:
   (a) the front face of any one cell, intermediate the end cells, and the back face of the first adjacent cell is defined by a first piece of material; and
   (b) the back face of said any one cell and the front face of the second adjacent cell is defined by a second piece of material.

2. The improvement in a honeycomb structure according to claim 1 wherein:
   (a) the front face of said any one cell is spaced from the back face of the first adjacent cell by a section of said first piece of material;
   (b) the back face of said any one cell is spaced from the front face of the second adjacent cell by a section of said second material.

3. The improvement in a honeycomb structure according to claim 2 wherein:
   (a) one longitudinal edge of said first piece of material is connected to a section of said second material adjacent the front face of said second adjacent cell; and
   (b) one longitudinal edge of said second material is connected to a section of said first material adjacent the back face of said first adjacent cell.

4. The improvement in a honeycomb structure according to any one of claims 1-3 wherein:
   (a) one side of the first material has a different physical characteristic than the other side, with the one side defining the outer surface of the front face of said any one cell and the other side defining the outer surface of the back face of said first adjacent cell;
   (b) one side of the second material has a different physical characteristic than the other side, with the one side defining the outer surface of the front face of said second adjacent cell and the other side defining the back face of said any one cell.

5. The improvement in a honeycomb structure according to claim 4 wherein:
   (a) the one side of both of said first and second materials have the same physical characteristics.

6. The improvement in a honeycomb structure according to claim 5 wherein:
   (a) the other side of both of said first and second materials have the same physical characteristics.

7. The improvement in a honeycomb structure according to any one of claims 1-3 wherein:
   (a) the front face of said any one cell has a greater amount of material extending between the first and second adjacent cells than the back face thereof.

8. The improvement in a honeycomb structure according to claim 7 wherein:
   (a) at least the front face of said any one cell includes a longitudinally extending crease maintaining said face in an angular configuration in the normal expanded condition of the honeycomb structure.

9. The improvement in a honeycomb structure according to claim 8 wherein:
   (a) the back face of said any one cell extends in a straight plane between said first and second adjacent cells in the normal expanded condition of the honeycomb structure.

10. A raisable window covering comprising:
    (a) an expandable-collapsible panel of the honeycomb construction of any one of claims 1-3.

11. A raisable window covering comprising:
    (a) an expandable-collapsible panel of the honeycomb construction of claim 6.

12. A raisable window covering comprising:
    (a) an expandable-collapsible panel of the honeycomb structure of claim 9.

* * * * *